United States Patent

Takashima et al.

[15] 3,643,036

[45] Feb. 15, 1972

[54] SYSTEM FOR DETECTING A POSITION ERROR IN THE STEP-BY-STEP MOVEMENTS OF MAGNETIC HEADS

[72] Inventors: Seiichi Takashima, Kamakura; Takatoshi Kato, Tokyo, both of Japan

[73] Assignee: Victor Company of Japan, Limited, Kanagawa-ku, Yokohama, Japan

[22] Filed: Jan. 26, 1970

[21] Appl. No.: 5,574

[30] Foreign Application Priority Data

Jan. 27, 1969 Japan....................................44/5319

[52] U.S. Cl......................................179/100.2 T, 178/6.6 P

[51] Int. Cl.......................................................G11b 21/06

[58] Field of Search ..........179/100.2 T; 178/6.6 DD, 6.6 FS, 178/6.6 P; 340/174.1 B, 174.1 C

[56] References Cited

UNITED STATES PATENTS 3,548,095 12/1970 Poulett.............................178/6.6 FS

*Primary Examiner*—Stanley M. Urynowicz, Jr.
*Assistant Examiner*—Robert S. Tupper
*Attorney*—Louis Bernat

[57] ABSTRACT

A system for detecting an error in the step-by-step movements of magnetic heads for a recording and reproducing apparatus using a rotary magnetic medium. A plurality of magnetic heads are alternately moved intermittently in a predetermined cycle over the rotary magnetic medium, from its marginal portion to its central portion and return, for example. The recording or reproducing is a continuous video signal recorded on a number of concentric circular tracks. The magnetic heads are moved in step-by-step motion. The recording magnetic head remains stationary over the rotating medium, each field or each frame of the video signal being recorded in one of the circular tracks. The inventive system enables a ready detection, and it indicates and corrects an error in the step-by-step movements of the magnetic heads.

11 Claims, 33 Drawing Figures

INVENTORS.
SEIICHI TAKASHIMA
TAKATOSHI KATO

BY Louis Bernat
ATTORNEY

INVENTORS.
SEIICHI TAKASHIMA
TAKATOSHI KATO
BY Louis Bernat
ATTORNEY

INVENTORS.
SEIICHI TAKASHIMA
TAKATOSHI KATO
BY Louis Bernat
ATTORNEY

INVENTORS.
SEIICHI TAKASHIMA
TAKATOSHI KATO

BY Louis Bernat
ATTORNEY

INVENTORS
SEIICHI TAKASHIMA
TAKATOSHI KATO

BY Louis Bernat
ATTORNEY

Fig. 7A, Fig. 7B, Fig. 7C, Fig. 7D, Fig. 7E, Fig. 7F, Fig. 7G, Fig. 7H, Fig. 7$\overline{H}$, Fig. 7I, Fig. 7J, Fig. 7K, Fig. 7L, Fig. 7M, Fig. 7N, Fig. 7O, Fig. 7P

INVENTORS.
SEIICHI TAKASHIMA
TAKATOSHI KATO

BY Louis Bernat

ATTORNEY

INVENTORS.
SEIICHI TAKASHIMA
TAKATOSHI KATO
BY Louis Bernat
ATTORNEY

SYSTEM FOR DETECTING A POSITION ERROR IN THE STEP-BY-STEP MOVEMENTS OF MAGNETIC HEADS

This invention relates to system for detecting an error in the step-by-step movements of magnetic heads for a recording and reproducing apparatus using a rotary magnetic medium, and more particularly it deals with a system for readily detecting and correcting an error in the step-by-step movements of magnetic heads. These heads are used for magnetic recording and reproducing apparatus wherein a plurality of magnetic heads are alternately moved in intermittent step-by-step motion, from the marginal portion of a rotary magnetic medium to its central portion and return.

Generally, a digital drive element, such as a stepping-pulse motor or the like, is used as means for alternately moving magnetic heads in intermittent step-by-step motion. A complicated logical circuit is used for controlling their movements.

The magnetic recording and reproducing apparatus uses a rotary magnetic medium. A plurality of magnetic heads are alternately moved in intermittent step-by-step motion over a magnetic sheet, magnetic disk, magnetic drum or other rotary magnetic medium. Movement is from the marginal portion to the central portion and return. Thus, the magnetic recording or reproducing is in a number of concentric circular tracks. It is possible to record a continuous video signal by utilizing the period during which one of the magnetic heads is moved in step-by-step motion and the other magnetic head remains stationary over the rotating medium. Each field or each frame of the video signal is recorded in one of the circular tracks.

This prior art system has disadvantages. When the loads of the stepping-pulse motor are excessively great or there is intruding noise, an error is liable to occur in the step-by-step movements of magnetic heads. This disturbs the order in which the magnetic heads alternately move in step-by-step motion. Thus, there is a resulting displacement between the absolute position of the magnetic medium and each magnetic head (mistracking).

In the prior art apparatus, any error in the step-by-step movements of magnetic heads, which might occur during recording, cannot be detected until it is reproduced. It is impossible to correct the recording error during a playback operation. Moreover, an error in the step-by-step movements of magnetic heads, which might occur in a playback operation, is very hard to correct. The correction in such case is usually a laborious job which involves time-consuming adjustments. First, the operation of the magnetic recording and reproducing apparatus must be stopped. Then the defective component or components of the magnetic head moving mechanism must be identified and then corrected. Thereafter the magnetic heads may ride on the correct tracks for each step.

The present invention overcomes all the aforementioned disadvantages of the prior art apparatus.

Accordingly, a principal object of this invention is to provide a system for detecting an error in the step-by-step movements of magnetic heads for magnetic recording and reproducing apparatus using a rotary magnetic medium. Another object is to readily detect and correct an error in the step-by-step movements of the magnetic heads in both recording and playback operations.

Another object of the invention is to provide a system for detecting an error in the step-by-step movements of magnetic heads. Here an object is to detect an error in the step-by-step movements of a plurality of magnetic heads which might occur when the magnetic heads are alternately moved intermittently over a rotary magnetic medium from its marginal portion to its central portion and return. In this connection, an object is to alternately use the magnetic heads to record a video signal on the magnetic medium.

More particularly, an object is to detect when each magnetic head is returned, by quick motion, to its step-by-step movement initiation position. Here the particular magnetic head is in the correct position.

Still another object of the invention is to indicate the occurrence of an error and give warning by means of an error indication lamp and an error warning buzzer, when such error occurs in the step-by-step movements of magnetic heads, during both recording and playback operations.

Additional objects as well as features and advantages of the invention will become evident from the description set forth hereinafter when considered in conjunction with the accompanying drawings, in which.

Figure 3:
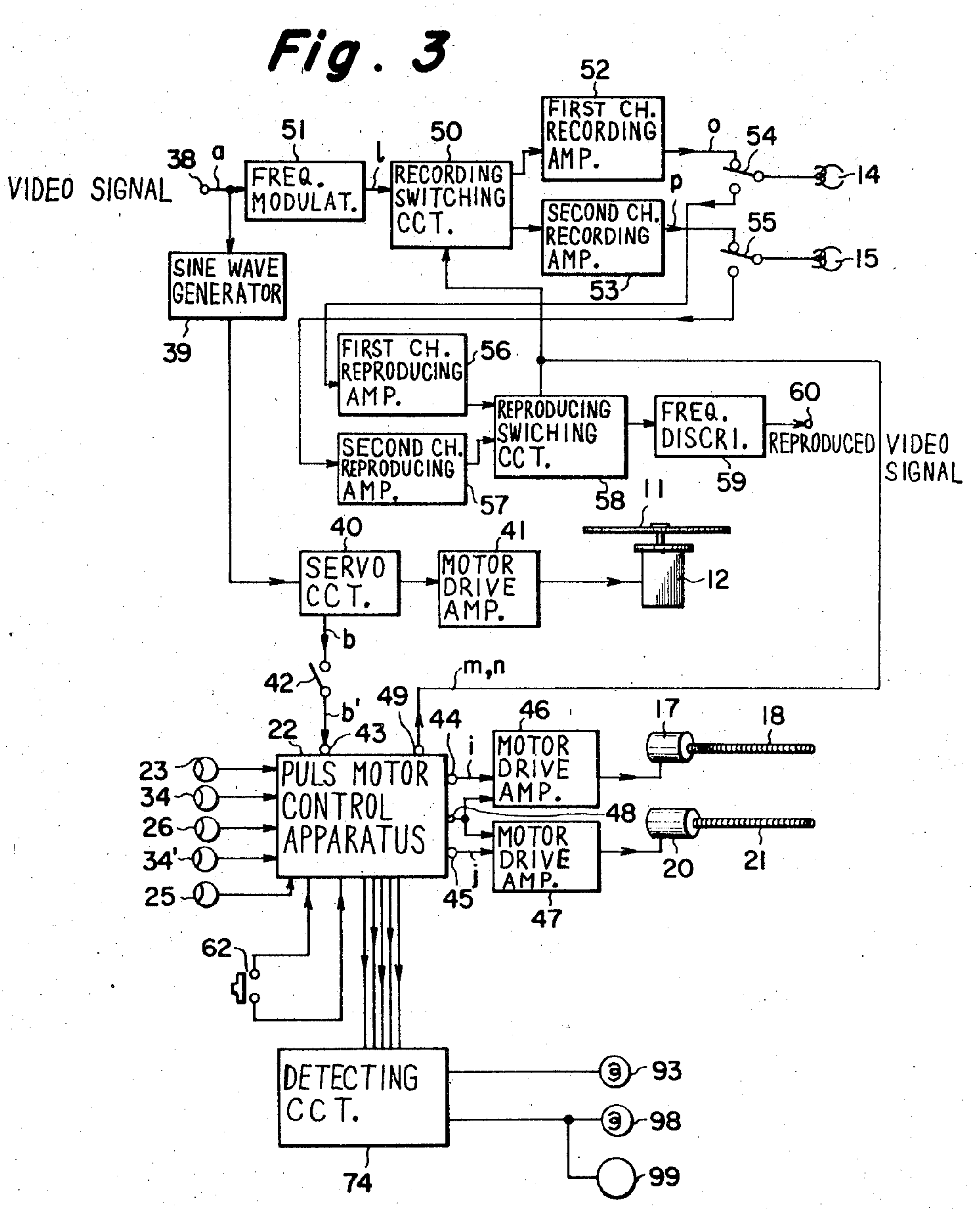
FIG. 3 is a schematic block diagram in explanation of the control system comprising one embodiment of this invention.
Figure 8:
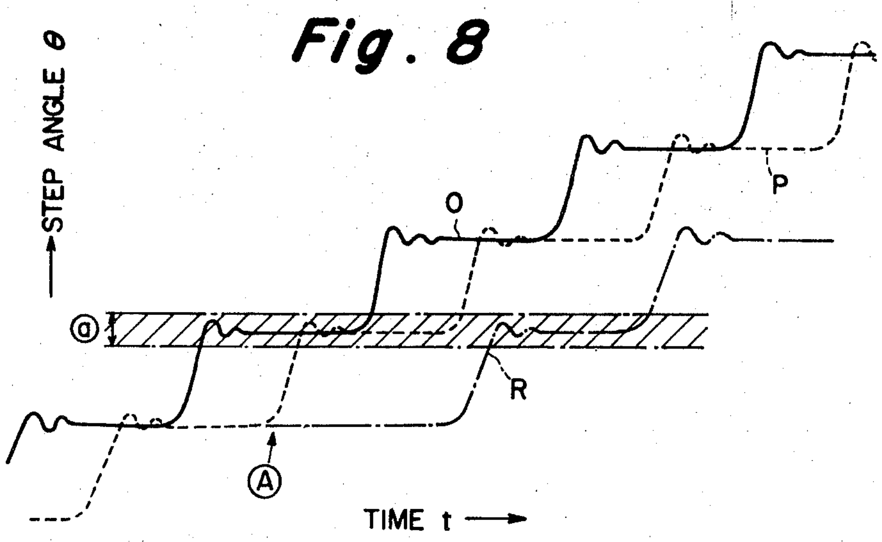

FIGS. 7A, 7B, 7C, 7D, 7E, 7F, 7G, 7H, 7$\overline{H}$, 7I, 7J, 7K, 7L, 7M, 7N, 7O, and 7P show waveforms of signals in explanation of the operation of the block diagram of FIG. 3;

FIG. 8 is a time chart of step-by-step movements of the magnetic heads in the control system comprising one embodiment of this invention; and FIGS. 9Q, 9R, 9S, 9K, 9T, 9U, 9R′ are time charts of the detection signals.

An embodiment of the system which accomplishes the aforementioned objects of this invention will now be explained with reference to the accompanying drawings.

Figure 1:
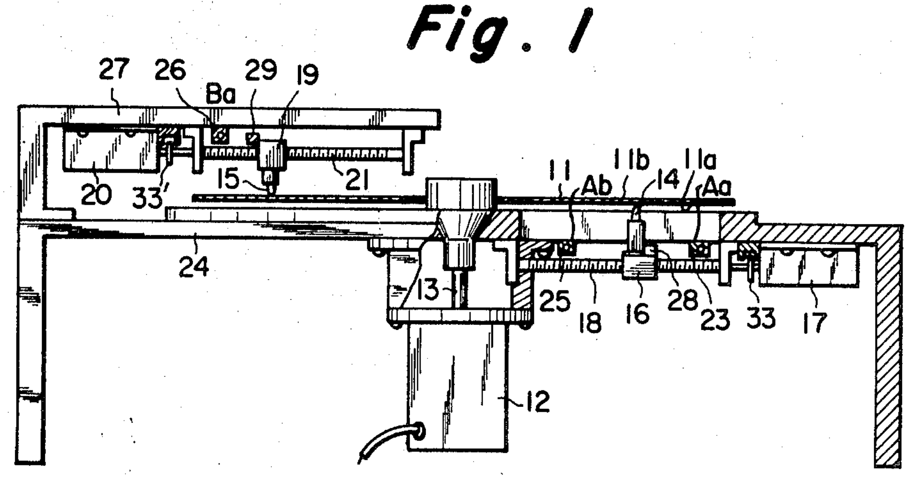
FIG. 1 is a schematic block diagram of a magnetic recording and reproducing apparatus using a rotary magnetic medium in which the detection system according to this invention can be incorporated.

In FIG. 1, a magnetic medium or magnetic disk 11 consists, for example, of a discal base material of relatively large thickness having coatings of a magnetic material applied to opposite surfaces thereof. Or, two magnetic disks may be bonded to each other in such a way that their magnetized surfaces face outwardly, with a layer of cushioning material being interposed therebetween. Thus, the magnetic disk 11 has a lower surface **11*a* and an upper surface 11*b* on which recordings can be made magnetically. As subsequently to be described, the magnetic disk 11 is rotated at a rate which corresponds to the duration of one frame of a television signal or 30 revolutions per second, for example. The magnetic disk rotating system is driven by synchronous motor 12** which is rotated in synchronism with the vertical synchronizing signal of a video signal.

A video signal is recorded on and reproduced from the two surfaces **11*a* and 11*b* of the magnetic disk 11 as it is rotated by the synchronous motor 12. Magnetic recording and reproducing heads 14 and 15 record or reproduce first and second channels, respectively. These heads are disposed in positions diametrically opposed to each other on opposite sides of a center shaft 13 of the motor 12. The magnetic head 14, for the first channel, is fixed to an upper portion of a first head-supporting member 16. A lower portion of support 16 is threadably engaged in a feed screw 18 which is directly connected to a rotor shaft of a first channel feed screw drive pulse motor 17. The magnetic head 15 records or reproduces the second channel. It is fixed to a lower portion of a second head-supporting member 19. An upper portion of member 19 threadably engaged in a feed screw 21, directly connected to a rotor shaft of a second channel feed screw drive pulse motor 20**.

Figure 4A:
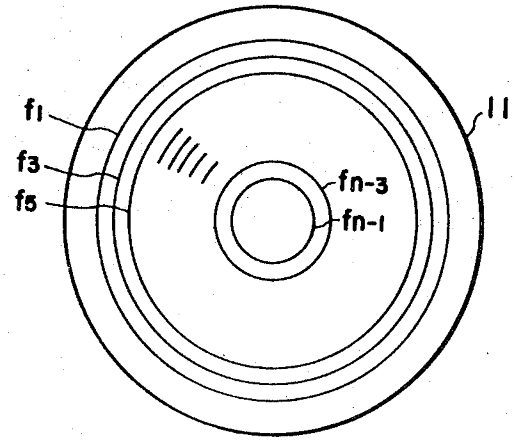
FIGS. 4A and 4B show track patterns on the rotary magnetic medium.
Figure 4B:
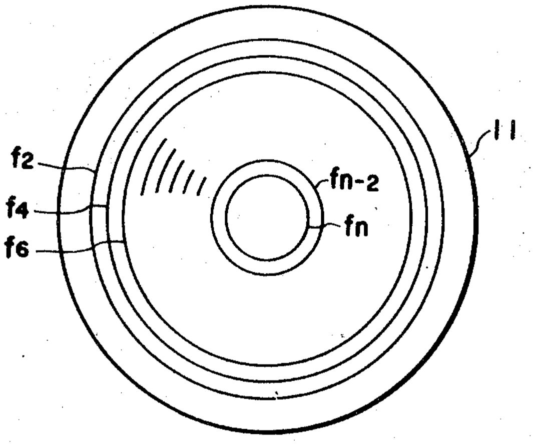

The feed screws 18 and 21 are rotated intermittently by the respective pulse motors 17 and 20. As the feed screws 18 and 21 are intermittently rotated, the magnetic heads 14 and 15 are intermittently moved. Head 14 moves over the lower surface **11*a* and head 15 moves over the upper surface 11*b* of the magnetic disk 11. This movement is linearly from the marginal portion of the disk to its central portion and return. Thus, concentric circular tracks are formed by the magnetic heads 14 and 15 on the lower surface 11***a* and upper surface 11*b* of the magnetic disk 11, respectively, as shown in FIGS. 4A and 4B. The pulse motors 17 and 20 are controlled by a pulse motor control circuit 22 shown in FIG. 3 as subsequently to be described.

In the embodiment shown, the rotational angle of one step movement of each of the pulse motors 17 and 20 (the angle through which the rotor shaft rotates in response to an input pulse) is selected to be 15°. This rotation moves the magnetic heads 14 and 15 over a distance corresponding to two track pitches over the lower surface 11*a* and upper surface 11*b* of the magnetic disk 11, respectively responsive to four step movements or a rotation of the motor through a rotational angle of 60°. Thus, four drive pulses move the magnetic heads a distance corresponding to two track pitches. Or, two drive pulses move the heads over a distance corresponding to one track pitch.

A phototransistor 23 is provided for detecting the movement initiation and direction-reversing position of the magnetic head 14. This photoelectric cell is mounted on a first baseplate 24 below a portion of the lower surface 11*a*, which corresponds to a first channel magnetic head movement initiation and direction-reversing position A*a*. A phototransistor 25 is provided for detecting the movement termination and direction-reversing position of the magnetic head 14. This photoelectric cell is mounted on the first baseplate 24 below a portion of the lower surface 11*a*, which corresponds to a first channel magnetic head movement termination and direction-reversing position A*b*. A phototransistor 26 is provided for detecting the movement initiation position of the magnetic head 15. This cell is mounted on a second baseplate 27 above a portion of the upper surface 11*b*, which corresponds to a second channel magnetic head movement initiation position B*a*.

Figure 2A:
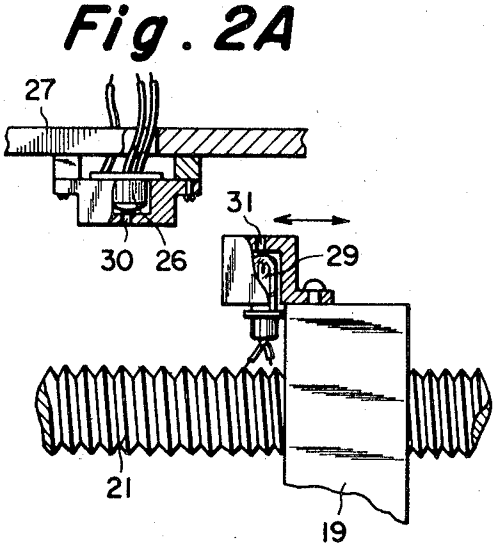
FIGS. 2A and 2B are detailed views in explanation of the detecting portion of the apparatus of FIG. 1.
Figure 2B:
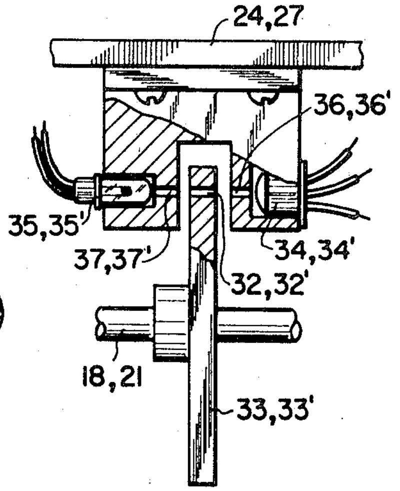

A lamp 28 is mounted on the first head supporting member 16 in a position in which it is aligned, axially of the feed screw 18, with the two phototransistors 23 and 25, which detect the positions A*a* and A*b* respectively and produce detection output signals upon incidence of light thereon from the lamp 28. As shown in FIG. 2A (plan view), a lamp 29 is mounted on the second head-supporting member 19. This lamp is in a position in which it is aligned, axially of the feed screw 21, with the phototransistor 26. The lamp 29, cell 26 combination detects the position B*a* and produces a detection output signal when the light from the lamp 29 passes through small diameter ducts 30 and 31 to the photocell 26.

The relative positions of the phototransistors 23 and 25 and lamp 28 on the first head-supporting member 16 are not shown in detail in drawings, their positions are similar in principle to those shown in FIG. 2A.

A rotary plate 33 (33') is formed with an opening 32 (32') of small diameter. Each plate is mounted on the feed screw 18 (21), for rotation as a unit. A rotational position detecting phototransistor 34 (34') and a lamp 35 (35') are disposed on opposite sides of the rotary plate 33 (33'). The opening 32 (32') formed in the rotary plate 33 (33') is aligned, axially of the feed screw 18 (21), with a small diameter duct 36 (36') leading to the phototransistor 34 (34'). A small diameter duct 37 (37') leads to the lamp 35 (35'). The diameter of these light ducts 30, 31, 36, 36', 37, 37' and openings 32, 32' is substantially 0.1 millimeter.

The light from the lamp 35 (35') strikes the phototransistor 34 (34'), when the opening 32 (32') in the rotary plate 33 (33'), is indexed with the phototransistor 34 (34') and lamp 35 (35'). Then the phototransistor 35 (35') produces a detection output signal.

It will thus be understood that the two rotary plates 33 and 33' are fixed to the feed screws 18 and 21 respectively in such a way that the openings 32 and 32' formed in the rotational plates 33 and 33' respectively are brought into index with the lamps 35 and 35' and phototransistors 34 and 34' respectively in predetermined rotational positions of the feed screws 18 and 21 respectively.

In FIG. 3, a video signal *a* (FIG. 7A) is supplied to an input terminal 38. On one hand, this signal drives a well-known sine wave generator 39 which separates the vertical synchronizing signal from the video signal, and then produces a sine wave voltage which is synchronous with the vertical synchronizing signal. The sine wave voltage is supplied, through a servo circuit 40, to a disk motor drive amplifier 41 where the sine wave voltage is amplified and transmitted to the magnetic disk rotating synchronous motor 12. Thus the motor 12 is controlled by the servo circuit 40 such that it is rotated in synchronism with the vertical synchronizing signal.

Magnetic head step-by-step movement initiation pulses *b* (FIG. 7B) are synchronous with the vertical synchronizing signal. These pulses are supplied (as pulses *b'*) from the servo circuit 40 through a step-by-step movement switch 42 to an input terminal 43 of a pulse motor control circuit 22. Each time the step-by-step movement initiation pulse *b* is supplied to the control circuit 22, drive pulses *i* and *j* (FIGS. 7I and 7J), respectively, are supplied through output terminals 44 and 45 of the pulse motor control circuit 22 to pulse motor drive circuits 46 and 47. These drive pulses alternately rotate the pulse motors 17 and 20 in step-by-step movement. The pulse motor drive circuits 46 and 47 are each composed of a ring counter and current amplifier circuit which rotate the pulse motors 17 and 20 step-by-step as the drive pulses *i* and *j* are applied thereto. The directions of rotation of the pulse motors 17 and 20 can be controlled by direction reverse control signals supplied through a control terminal 48 of the pulse motor control circuit 22 to pulse motor drive circuits 46 and 47.

Channel-switching signals *m* and *n* (FIGS. 7M and 7N) are produced in the control circuit 22 responsive to the step-by-step movement initiation pulses *b*. Signals *m* and *n* are supplied, through an output terminal 49 of the control circuit 22 to a recording channel-switching circuit 50.

On the other hand, the video signal *a* is transmitted to a frequency modulation circuit 51 where the signal is frequency-modulated into a continuous frequency-modulated signal *l* (FIG. 7L) is switched, by the aforementioned channel-switching signals *m* and *n* for each field of the signal, into recording signals *o* and *p* for the first channel and second channel, shown in FIGS. 7O and 7P respectively. The recording signals *o* and *p* have their voltages amplified to optimum recording voltages by recording amplifiers 52 and 53 for the first channel and second channel respectively. The amplified signals are supplied, through recording and playback changeover switches 54 and 55 respectively, to the magnetic heads 14 and 15 for the first channel and second channel respectively. (The recording and playback changeover switches 54 and 55 are shown in FIG. 3 in a recording position).

The phases of the channel-switching signals *m* and *n* are determined by the control circuit 22. The recording signals *o* and *p* are recorded on the opposite surfaces 11*a* and 11*b* of the magnetic disk 11 respectively, during the time while the magnetic heads 14 and 15 alternately remain stationary. The magnetic heads 14 and 15 start their successive intermittent step-by-step movements from their movement initiation positions A*a* and B*a*, respectively. These heads record the video signal on opposite surfaces of the magnetic medium. The odd-numbered fields are recorded on the lower surface 11*a* of the magnetic disk 11 by the magnetic head 14, for the first channel. These are fields $f_1, f_3, f_5 \ldots f_{n-3}, f_{n-1}$ of the video signal a consisting of continuous fields $f_1, f_2, f_3 \ldots f_{n-}, f_n$ shown in FIG. 7A. The even-numbered fields are recorded on the upper surface 11*b* of the magnetic disk 11 by the magnetic head 15, for the second channel. These fields $f_2, f_4, f_6 \ldots f_{n-2}, f_n$ of the video signal *a*. All of the fields are recorded in tracks arranged in concentric circles in accordance with the patterns shown in FIGS. 4A and 4B.

More specifically, first, magnetic head 14 records one field or one frame of the video signal in a track $f_1$ on the lower surface 11*a* of the magnetic disk 11. As soon as recording of the field $f_1$ is completed, the signal current to be recorded is switched instantly to the magnetic head 15 for the second channel which forms a track $f_2$ on the upper surface 11*b* of the magnetic disk 11. During the signal-recording operation of the magnetic head 15 for the second channel, the magnetic head 14 is moved radially from the track $f_1$ toward the central portion of the magnetic disk. Movement is a distance corresponding to two track pitches. Upon completion of the recording of the track $f_2$ on the upper surface 11*b* of the magnetic disk 11, the signal current is switched from the magnetic head 15 to the magnetic head 14 which records a track $f_3$ on the lower surface 11*a* of the magnetic disk 11. Similarly, the magnetic head 15 is moved radially from the track $f_2$ toward the central portion of the magnetic disk a distance corresponding to two track pitches. This movement occurs during the signal recording operation of the magnetic head 14. Thus, the magnetic head 15 for the second channel records a track $f_4$ adjacent the track $f_2$.

This cycle of operation is repeated so that tracks $f_5, f_7 \ldots f_{n-3}, f_{n-1}$ are formed on the lower surface 11*a* of the magnetic disk 11 by the magnetic head 14, and tracks $f_6, f_8 \ldots f_{n-2}, f_n$ are formed on the upper surface 11*b* thereof by the magnetic head 15 for the second channel. All of the tracks are formed successively from the marginal portion toward the central portion of the magnetic disk.

In their alternate and intermittent step-by-step movements from the marginal portion of the magnetic disk toward its central portion, the magnetic head 14 for the first channel moves ahead of the magnetic head 15 for the second channel. When the magnetic head 14 reaches the direction of movement reversing position A*b*, the light from the lamp 28 mounted on the head-supporting member 16 mounting the magnetic head 14 strikes the phototransistor 25. This transducer produces a detection output signal upon incidence of the light thereon.

The detection output signals produced by the phototransistors 25, 34 are gated to produce a magnetic head step-by-step movement direction reversing control signal which is supplied to the control circuit 22. The directions of rotation of the pulse motors 17 and 20 are reversed by signals from the control circuit 22, responsive to the completion of the magnetic head 15 radial travel across the magnetic disk from its outer marginal portion to its central portion. At the same time, the order of magnetic heads 14 and 15 is also reversed, so that the magnetic head 15 for the second channel moves ahead of the magnetic head 14 for the first channel in their alternate intermittent step-by-step movements from the central portion of the magnetic disk towards its marginal portion.

When the magnetic head 15 reaches the movement initiation position B*a*, the light from the lamp 29 mounted on the head-supporting member 19 mounting the magnetic head 15 strikes the phototransistor 26. Responsive thereto the phototransistor 26 produces a detection output signal. The detection output signal produced by the phototransistor 26 and a detection output signal produced by the phototransistor 34' are gated to produce a control signal which is supplied to the control circuit 22. The directions of rotation of the pulse motors 17 and 20 are reversed by signals from the control circuit 22 responsive to the completion of the magnetic head 14 radial travel across the magnetic disk from its central portion to its outer marginal portion. At the same time, the order of alternate intermittent step-by-step movements of the magnetic heads 14 and 15 are also reversed, so that the magnetic head 14 for the first channel moves ahead of the magnetic head 15 for the second channel in their alternate intermittent step-by-step movements.

Next normal playback operation of the system according to this invention will be explained. During a playback operation, the recording and playback changeover switches 54 and 55, FIG. 3, are brought into engagement with the lower contacts. The signals reproduced by the magnetic heads 14 and 15 are supplied to channel playback amplifiers 56 and 57, respectively. There they are amplified and thence transmitted to a playback channel switch 58 together with the aforementioned channel switch signals *m* and *n*. While either one of the magnetic heads remains stationary, the reproduced signals are selected and switched in the playback channel switch 58 to produce a continuous frequency-modulated signal. This signal is then supplied to a frequency discriminator 59 where the continuous signal is demodulated and taken out of the system through an output terminal 60 as a reproduced video signal.

Figure 5:
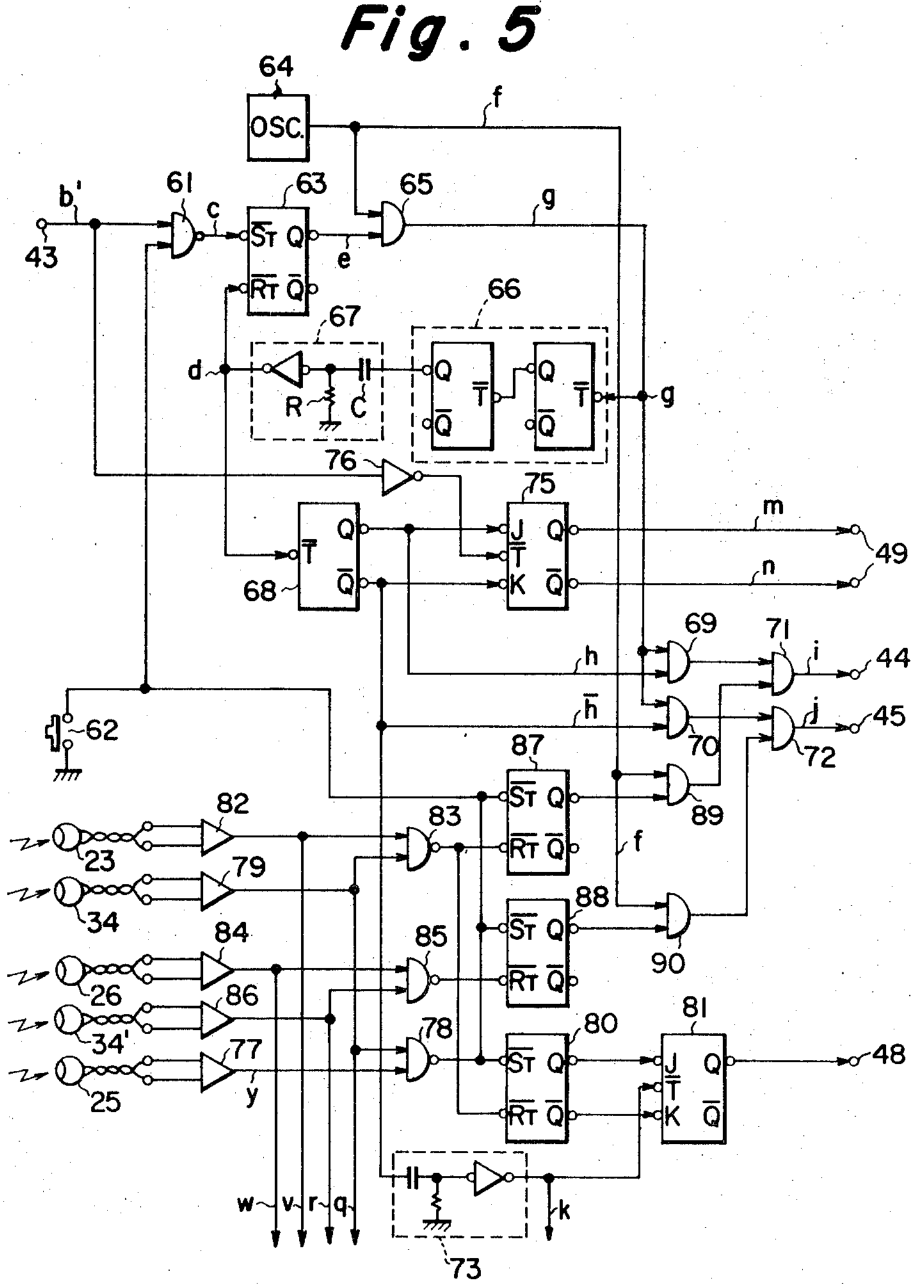
FIG. 5 is a schematic block diagram in explanation of the control portion of the control system of FIG. 3.

The pulse motor control circuit 22 will be explained in detail with reference to FIG. 5.

As shown in FIG. 3, the step-by-step movement initiation pulses *b* produced by the servo circuit 40 are supplied as the input pulses *b'* to the input terminal 43 of the control circuit 22 through the step-by-step movement switch 42. The pulse *b'* is supplied to a NAND-gate circuit 61 as shown in FIG. 5. The pulse *b'* appears as a negative pulse *c* of FIG. 7C in the output of a gate circuit 61 a quick return switch 62 is not closed.

An R-S flip-flop circuit 63 is set when the negative pulse *c* is applied to an $\overline{ST}$ terminal of the circuit 63. A positive potential is produced at a Q terminal and a zero potential is produced at a $\overline{Q}$ terminal. The R-S flip-flop circuit 63 is reset when the negative pulse *d* is applied to an $\overline{RT}$ terminal of the circuit 63. A zero potential is produced at the Q terminal and a positive potential is produced at the $\overline{Q}$ terminal.

On the other hand, at all times a pulse-generating circuit 64 produces a continuous positive pulse signal *f* of 300 pps to 1,000 pps as shown in FIG. 7F. The positive pulse signal *f* is applied, through an AND-GATE 65, to a four-step counter 66 consisting of two T flip-flops only when the potential of Q terminal of the flip-flop 63 is positive.

The potential of output of the four-step counter 66 is changed from positive to zero each time four input pulses are applied to the counter 66. The output taken out as a negative pulse *d* (FIG. 7D) by a negative pulse shaping and amplifying circuit 67. The capacitor C and resistor R in the circuit 67 form a differentiation circuit. The negative pulse *d* is supplied to the $\overline{RT}$ terminal of the flip-flop circuit 63. Responsive thereto, flip-flop circuit 63 is reset, and a zero potential is produced in the Q terminal. This cycle continues to repeat until the next step-by-step initiation pulse *b'* is applied. By this operation, a pulse *e* shown in FIG. 7E is produced as an output of the flip-flop circuit 63, and a pulse signal *g* as shown in FIG. 7G is produced as an output of the AND-gate circuit 65.

The negative reset pulse *d* (FIG. 7D) is obtained by differentiating and shaping the output of the four-step counter 66 by the negative pulse shaping and amplifying circuit 67. The reshaped pulse is applied to a T flip-flop circuit 68, as a step-by-step movement termination pulse. This causes the T flip-flop circuit 68 to produce, at its output terminals Q and $\overline{Q}$, pulse motor switching signals *h* and $\overline{h}$ shown in FIGS. 7H and $\overline{7H}$ respectively. The pulse generator 64 produces the pulse signal *g* by gating the pulse signal *f* with the output signal *e* of the flip-flop circuit 63 consists of positive pulses. Four of the positive pulses form a set. The pulse signal *g* is gated by an AND-gate circuit 69 or 70, depending on whether the pulse motor switching signal from the flip-flop circuit 68 is *h* or $\overline{h}$. Then, the gate signal *g* is passed through OR-gate circuits 71 and 72. The output signal is applied to the terminals 44 and 45 as the drive pulses *i* and *j* (FIGS. 7I and 7J) respectively. These signals alternately rotate the pulse motors 17 and 20 intermittently.

The pulse motor switching signal $\overline{h}$ is supplied to a negative pulse shaping and amplifying circuit 73 where its leading edge is differentiated and shaped to be changed into a second channel step-by-step movement termination pulse signal *k*. This signal indicates that the step-by-step movements of the magnetic heads 14 and 15 and the stepwise rotation of the pulse motors 17 and 20 terminated. The pulse signal *k* is supplied to a direction reversing operation and error detection circuit 74 of FIGS. 3 and 6 subsequently to be described.

A J-K flip-flop circuit 75 which functions such that the channel switching signals *m* and *n*, produced both in recording and playback operations, are produced by bringing the pulse motor switching signals *h* and $\overline{h}$ into synchronism with the step-by-step movement initiation pulses *b'*. Inserted between the J-K flip-flop circuit 75 and terminal 43 is a pulse polarity converter 76 for shaping the step-by-step movement initiation pulses $b'$ in such a way that they meet the input conditions of the J-K flip-flop circuit.

Next to be described is the reversing of the directions of movement of the magnetic heads in their step-by-step movement direction-reversing positions and step-by-step. The magnetic heads 14 and 15 start their step-by-step movements one after the other from their step-by-step movement initiation positions. As they reach their step-by-step movement direction reversing positions, a detection output signal $y$ from the phototransistor 25 is supplied to a NAND-gate circuit 78 through an amplifier 77. At the same time, a detection output signal $q$ of the phototransistor 34 is provided for increasing the accuracy and precision of the detected position. This signal is supplied to the NAND-gate circuit 78 through an amplifier 79. The output of the circuit 78 sets an R-S flip-flop circuit 80. The output signals are applied to J and K terminals of a J-K flip-flop circuit 81. The output signals of the J-K flip-flop circuit 81 are switched in synchronism with the second channel step-by-step movement termination pulses after the output signals of the R-S flip-flop circuit 80 are switched.

Thus, after the step-by-step movement of the magnetic head for the second channel is completed, an output signal of positive potential is produced in a Q terminal of the J-K flip-flop circuit 81. Supplied to the pulse motor drive circuit 46 through a terminal 48 as a direction-reversing control signal for reversing the directions of rotation of the pulse motors 17 and 20.

The magnetic heads return, by their step-by-step movement, to the initiation positions, after the directions of rotation of the pulse motors are reversed. A detection output signal $v$ of the phototransistor 23 is supplied to a NAND-gate circuit 83 through an amplifier 82. At the same time, the detection output signal $q$ of the phototransistor 34 is supplied to the NAND-gate circuit 83 through an amplifier 79. Thus, the R-S flip-flop circuit 80 is reset by the output of the circuit 83. Its output signals are applied to K and J terminals of the J-K flip-flop circuit 81 which is reset, again in synchronism with the second channel step-by-step movement termination pulse. A positive potential is produced at the Q terminal of the flip-flop circuit 81.

This operation is repeated as long as the step-by-step movement switch 42 is closed. A detection output signal $r$ of the phototransistor 34' is supplied to a NAND-gate circuit 85 through an amplifier 86, simultaneously with a detection output signal $w$ of the phototransistor 26 which is supplied to the NAND-gate circuit 85 through an amplifier 84, so that an output is produced in the circuit 85.

The output signals of the NAND-gate circuits 78, 83, and 85 are supplied to the $\overline{ST}$ terminals of the R-S flip-flop circuits 80, 87 and 88, respectively.

A quick return operation will now be explained. This operation can be performed by closing a quick return switch 62, when recording and playback operations are stopped during the operations. The step-by-step movement initiation position is indicated when the apparatus is connected to the power source. Or an error in operation during the step-by-step movements is corrected.

Upon closure of the switch 62, the NAND-circuit 61 is energized continuously, so that normal step-by-step movements are inhibited. The output signals of the flip-flop circuits 87 and 88 are supplied to AND-gate circuits 89 and 90 respectively. The pulse signal $f$ of the pulse generator 64 is supplied to the gates 89, 90 which are gated thereby. The output signals of the AND-gate circuits 89 and 90 are supplied to the OR-gate circuits 71 and 72, respectively. These signals are converted to pulse motor drive pulses $i$ and $j$ which are transmitted to the pulse motors 17 and 20 respectively through the terminals 44 and 45. Since the drive pulses $i$ and $j$ are continuous pulses, the pulse motors 17 and 20 are rotated continuously.

On the other hand, the signal through the quick return switch 62 is also supplied to an $\overline{ST}$ terminal of the R-S flip-flop circuit 80. Thus a direction reversing control signal is taken out through the terminal 48 for reversing the direction of rotation of the pulse motors 17 and 20 and bringing the same to a quick return state. Then the magnetic heads 14 and 15 are returned, in their step-by-step movement, to the initiation positions in a quick return operation.

The phototransistors 23 and 26 mounted in the step-by-step movement initiation positions of the magnetic heads produce detection output signals $v$ and $w$ which are supplied to $\overline{RT}$ terminals of the flip-flop circuits 87 and 88 respectively. These circuits are reset after when the NAND-gate circuits 83 and 85 detects the output signals $q$ and $r$ of the phototransistors 34 and 34'. This closes the AND-gate circuits 89 and 90, thereby shutting off the pulse motors 17 and 20.

From the foregoing, it will be appreciated that the magnetic heads are always returned to their normal step-by-step movement initiation positions regardless of the positions in which they are disposed when the quick return switch 62 is closed. The phototransistors 23, 26, 34, and 34' are all in a state in which they have produced detection output signals $v$, $w$, $q$, and $r$ at this time. It is thus possible to give an indication that the magnetic heads 14 and 15 are in their normal step-by-step movement initiation positions since all of the detection output signals of the phototransistors are supplied to a multiple input AND-gate circuit 91 (FIG. 6) of the step-by-step movement error detection circuit 74. An output signal $s$ from the circuit 91 (FIG. 9S) is used to light a movement initiation position indication lamp 93, after having been amplified by a lamp amplifier 92.

Figure 6:
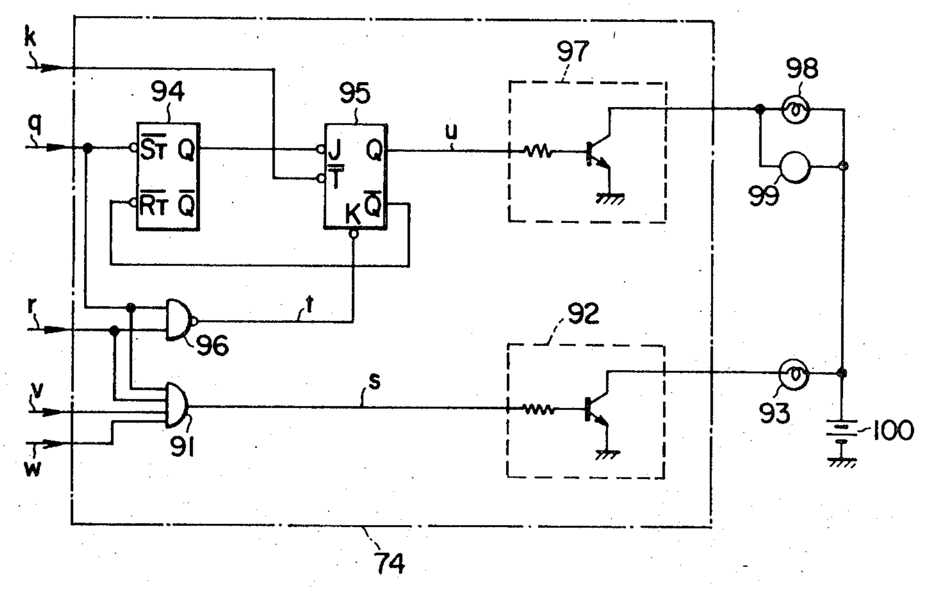
FIG. 6 is a schematic block diagram of the error detecting portion of the control system of FIG. 3.
Figure 7:
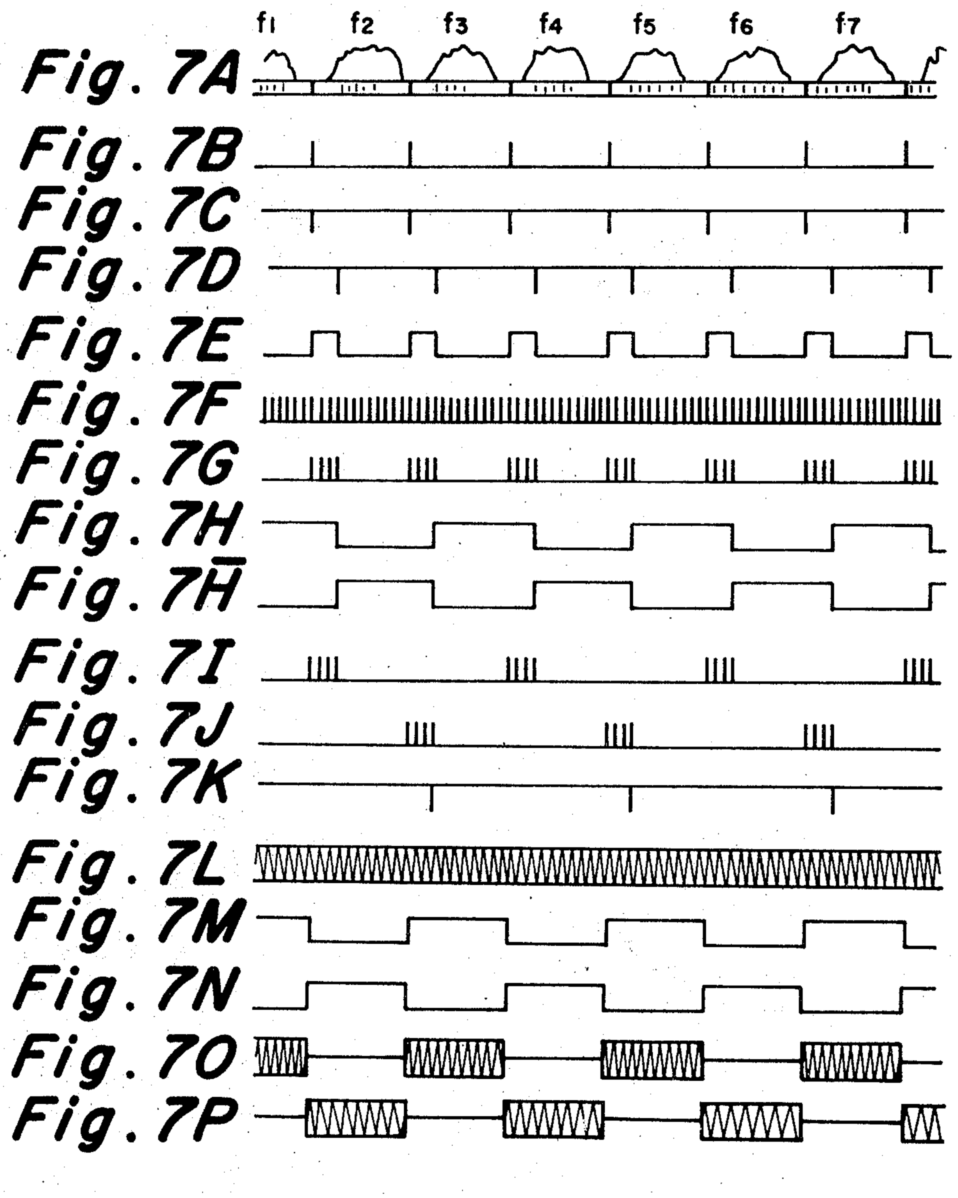

The operation of the step-by-step movement error detection circuit 74 will be explained in detail with reference to FIGS. 6 and 8. In the graph of FIG. 8, the angles of rotation of the pulse motors $\theta$ on the vertical axis are plotted against elapsed times $t$ on the horizontal axis. The control circuit 22 controls the pulse motors 17 and 20 such that the motors are alternately rotated in stepping motion through an angle $\theta_1$ for each $t_1$ second.

Figures 9K, 9Q, 9R, 9S, 9T, 9U:
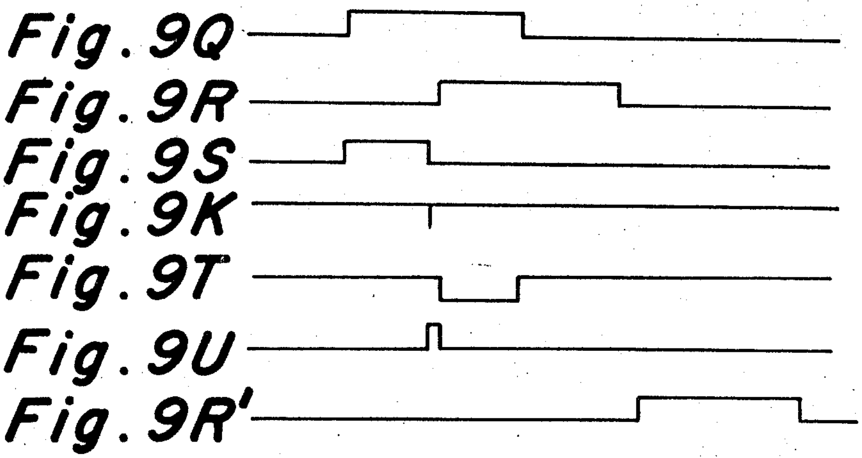

The motors 17 and 20 rotate in a manner shown by a solid line curve O and a broken line curve P respectively in FIG. 8. The inclined portions of the curves O and $p$ represent step-by-step movement periods, and the horizontal portions thereof represent stationary periods. It will be noted that if the magnetic heads 14 and 15 are moved in normal step-by-step movements, certain portions of the stationary periods of the two magnetic heads overlap each other. A hatched portion Ⓢ in the graph represents the detection period of the phototransistors 34 and 34'. If the pulse motors 17 and 20 were to make one complete revolution in $n$ steps, the phototransistors 34 and 34' would produce detection output signals shown in FIGS. 9Q and 9R for every $n$ steps. If, however, one of the motors or the motor 20 for the second channel, for example, is incorrectly stepped to a point Ⓐ and then remains stationary thereafter, the step-by-step movement of the magnetic head 15 follows a dash-and-dot line R, as shown in FIG. 8. The detection output signal $r'$ of the phototransistor 34' at this time would be as shown in FIG. 9R'.

The error detection circuit consists of flip-flop circuits 94 and 95 (FIG. 6) and NAND-circuit 96. The detection output signal $q$ of the phototransistor 34 is supplied to an $\overline{ST}$ terminal of the R-S flip-flop circuit 94. That is, the phototransistors 34 and 34' are arranged to produce detection output signals $q$ and $r$ respectively when the pulse motor 20 initiates its stepwise rotation. The phototransistor 34, for the first channel, produces a detection output signal $q$ after it has rotated $n$ steps following initiation of the stepwise rotation. This signal sets the R-S flip-flop circuit 94. The flip-flop circuit 95 is a J-K flip-flop circuit with an output of the R-S flip-flop circuit 94 being applied to a T terminal thereof as a positive potential. Thus, the J-K flip-flop circuit 95 is set if the second channel step-by-step movement termination pulse $k$ is supplied to a $\overline{T}$ terminal of the circuit 95 following the next step-by-step movement of the magnetic head 15. If the magnetic head is moving in a normal step-by-step manner, the phototransistor 34' for the second channel produces the detection output signal $r$.

If the pulse motors 17 and 20 rotate in normal stepwise movements and the magnetic heads 14 and 15 move in normal step-by-step movements, the detection output signals *q* and *r* will be supplied to a NAND-circuit 96. This produces an output signal *t* depending on the period during which the two signals *q* and *r* occur simultaneously. The output signal *t* is supplied to a K terminal of the flip-flop circuit 95 to reset the circuit. If, however, an error occurred in the stepwise rotation of the pulse motors as shown by the line R in FIG. 8, the detection output signals of the phototransistors 34 and 34' would be as shown in FIGS. 9Q and 9R'. Hence, with an error there would be no overlapping portions in the periods of occurrence of the detection output signals *q* and *r*. Thus, the NAND-circuit 96 would produce no output signal and the J-K flip-flop circuit 95 would be maintained in a set state. If the output signal *u* shown in FIG. 9U of the J-K flip-flop circuit 95 is amplified by the amplifier 97 for lamp and buzzer and used for actuating an error indication lamp 98 and error warning buzzer 99, it is possible to indicate or warn, when an error occurs in operation. 100 designates a power source for the lamps 93 and 98 and the buzzer 99.

The error in operation thus indicated or warned can be corrected by returning the magnetic heads to their step-by-step movement initiation positions by performing the quick return operation as aforementioned.

While the invention has been described with reference to a preferred embodiment thereof, it is to be understood that the invention is not limited to the specific form of the embodiment, and that many modifications and combinations may be made therein without departing from the spirit and scope of the invention.

What is claimed is:

1. A system for controlling the step-by-step movements of magnetic heads comprising a rotary magnetic medium, a plurality of magnetic heads maintained in contact with said magnetic medium, means for rotating said magnetic medium at a predetermined rate, means comprising said plurality of magnetic heads for recording and reproducing a signal in a plurality of concentric tracks formed on said magnetic medium, means for alternately moving said plurality of magnetic heads over a radius of said magnetic medium in intermittent step-by-step movements, said system continuously recording signals on said medium with one of said heads recording while the other of said heads is stepping, motion detecting means for confirming the physical occurrence of said stepping motion, each stationary period in said step-by-step movement including a portion when one of said plurality of magnetic heads overlaps a stationary portion of the other magnetic head, and means responsive to the detection of an error by said motion-detecting means in the operation of said means for alternately moving said plurality of magnetic heads in intermittent step-by-step movements for detecting the absence of overlapping portions in said detection signals and actuating an error informing device.

2. A system as defined in claim 1 in which said error informing device comprises a sensory signal error indication device.

3. A system as defined in claim 1 further comprising intermittent step-by-step movement error correction means comprising quick return means for returning each of said plurality of magnetic heads to its step-by-step movement initiation position, means for detecting the step-by-step movement initiation position of each of said plurality of magnetic heads, and means for controlling said means for alternately moving said plurality of magnetic heads in intermittent step-by-step movements with a detection output signal of said step-by-step movement initiation position detection means.

4. A system as defined in claim 1 in which there are two of said plurality of magnetic heads and said means for alternately moving said two magnetic heads in intermittent step-by-step movements consists of two units, each of said units comprising a pulse motor, a feed screw connected to the rotary shaft of said pulse motor, and a head supporting member mounting one of said two magnetic heads and threadably engaging said feed screw.

5. A system as defined in claim 4 wherein said step-by-step motion error detection means comprises first detection means for detecting a rotational angular position of said feed screw of one of said units and producing a first detection signal, second detection means for detecting a rotational angular position of said feed screw of the other unit and producing a second detection signal, and an AND gate circuit to which said first detection signal and said second detection signal are connected, said AND gate circuit producing an output signal during the period while said two detection signals are simultaneously produced, and said AND gate circuit does not produce an output signal during the period while said two detection signals are not produced simultaneously.

6. A system for detecting an error in the step-by-step movements of magnetic heads associated with a rotary magnetic medium, means comprising a plurality of magnetic heads maintained in contact with said magnetic medium, means for rotating said magnetic medium at a predetermined rate, means comprising said plurality of magnetic heads for recording and reproducing a signal in a plurality of tracks formed on said magnetic medium, means for alternately moving said plurality of magnetic heads over a path along the radius of said magnetic medium, said movement being in intermittent step-by-step movements, each stationary period in said step-by-step movements including an interval during which one of said plurality of magnetic heads overlaps a stationary portion of the other magnetic head, means for switching a continuous recording signal to supply the recording signal to alternate ones of said magnetic heads during the time while the operating one of said magnetic heads remains stationary, means for selecting and switching signals reproduced by alternate ones of said magnetic heads to produce a continuous signal, means for detecting the positions where said magnetic heads remain stationary and for producing detection signals indicative of said stationary position, an AND gate circuit means to which said detection signals are applied, said AND gate circuit producing an output signal during the period while said detection signals are simultaneously produced and producing no output signal during the period while said detection signals are not produced simultaneously, and means for detecting the absence of overlapping portions in one of said detection signals and said output signal of said AND gate circuit, and means for actuating an error-indicating device.

7. A system as defined in claim 6 in which there are two of said magnetic heads, and said means for alternately moving said two magnetic heads in intermittent step-by-step movements comprising two units each having a pulse motor, a feed screw connected to the rotary shaft of said pulse motor, and a head supporting member individually mounting one of said two magnetic heads and threadably engaging said feed screw.

8. A system as defined in claim 6 in which said error-indicating device comprises an error indication lamp.

9. A system as defined in claim 6 in which said error-indicating device comprises an error warning buzzer.

10. A system as defined in claim 6 in which said error-indicating device comprises an error indication lamp and an error warning buzzer.

11. A system as defined in claim 6 further comprising intermittent step-by-step movement error correction means comprising quick return means for returning each of said magnetic heads to its initial position, means for detecting the initial position of each of said magnetic heads, and a quick return switch controlling said quick return means.

* * * * *